United States Patent [19]

Zimmerman et al.

[11] 4,026,837

[45] May 31, 1977

[54] POLYMERIC ACID SALTS AS ISOCYANURATE FOAM CATALYSTS

[75] Inventors: Robert LeRoy Zimmerman; Thomas Howard Austin, both of Austin, Tex.

[73] Assignee: Texaco Development Corporation, New York, N.Y.

[22] Filed: Sept. 19, 1975

[21] Appl. No.: 614,810

[52] U.S. Cl. .................. 260/2.5 AB; 260/2.5 AC; 260/2.5 AW; 260/77.5 AB; 260/77.5 AC; 260/77.5 NC; 260/859 R; 260/898; 260/2.5 BE
[51] Int. Cl.$^2$ ........................................ C08G 18/14
[58] Field of Search ............... 260/2.5 AB, 2.5 AC, 260/2.5 AW, 77.5 AB, 77.5 AC, 77.5 NC, 859 R, 898, 2.5 BE

[56] References Cited

UNITED STATES PATENTS

| | | | |
|---|---|---|---|
| 3,168,483 | 2/1965 | Beitchman et al. | 260/2.5 AW |
| 3,314,901 | 4/1967 | Daumiller et al. | 260/2.5 AC |
| 3,644,232 | 2/1972 | Bernard et al. | 260/2.5 AW |
| 3,676,380 | 7/1972 | McLaughlin et al. | 260/2.5 AW |
| 3,745,133 | 7/1973 | Comunale et al. | 260/2.5 AW |

*Primary Examiner*—Eugene C. Rzucidlo
*Attorney, Agent, or Firm*—Carl G. Ries; Thomas H. Whaley; James L. Bailey

[57] ABSTRACT

New catalysts for isocyanurate foams comprising the potassium salt of a carboxy-terminated butadiene-acrylonitrile copolymer. The novel foams are obtained by the polymerization of an aromatic polyisocyanate, and a polyether or polyester polyol in the presence of a blowing agent and said copolymer useful as an isocyanurate group formation catalyst. The novel foams are useful in preparing rigid, flexible, semirigid or semiflexible materials such as panels, slabs or sprayed foam surfaces.

9 Claims, No Drawings

POLYMERIC ACID SALTS AS ISOCYANURATE FOAM CATALYSTS

BACKGROUND OF THE INVENTION

1. Field of the Invention

This invention pertains to the field of isocyanurate catalysts. More particularly, this invention relates to the use of the potassium salt of carboxyl-terminated butadiene-acrylonitrile copolymer as an isocyanurate catalyst.

2. Description of the Prior Art

The use of catalysts in preparing isocyanurate foams via the polymerization of a polyol, polyisocyanate and optionally other ingredients in the presence of a blowing agent is well-known. The isocyanurate group formation catalyst is used to trimerize the isocyanate groups to form the isocyanurate linkages. The polyol essentially act as a modifying or reaction plasticizing agent in the overall polymeric scheme, since a polymer containing only isocyanurate groups is itself too friable. Thus, the isocyanurate foam contains both isocyanurate groups as well as urethane linkages, with said urethane linkages acting to plasticize the foam. Initially the reaction proceeds to give primarily a urethane quasi-prepolymer containing active isocyanate groups. Subsequently, the excess isocyanate reacts to form isocyanurate groups which ultimately produces a urethane-modified-polyisocyanurate polymer.

Depending upon process condition utilized, both rigid and flexible polyisocyanurate foams may be prepared as well as the semi-flexible and semi-rigid types. Some main uses of the resultant foam include those of thermal insulation, and as building materials and the like. Examples of some prior art isocyanurate foams and methods of preparation are described in U.S. Pat. Nos. 3,745,133; 3,644,232; 3,676,380; 3,168,483; and 3,516,950, to name a few.

A number of prior art polyisocyanurate catalysts are known. However, in many instances these catalysts suffer from one or more deficiencies. Particularly, while useful in promoting trimerization of the isocyanate groups to isocyanurate polymer units the catalysts cause foam processing problems. Thus, in some instances such well known catalysts as potassium octoate and potassium acetate catalysts are overly temperature dependent. Thus, an unduly rapid end-cure is realized in some cases with such catalysts. That is, with a gradual rise in temperature, catalyst activity is increased in an excessive manner, making it difficult to properly control foam rise. Yet, in many cases, typified by slab foam formation, a uniform cure rate is particularly sought.

In other situations catalysts such as amine-type isocyanurate catalysts including amino hexahydrotriazines are unduly slow with respect to their reactivity rate resulting in a lagging end-cure. As a result, the foam so cured is not sufficiently cured in time to properly handle. The soft green foam coming out of the machine will have a tendency to warp it, for example, panel board is being produced.

It will therefore be a considerable advance in the art if a new class of isocyanurate catalysts were discovered which overcomes the just discussed processing drawbacks whereby optimum foam cure rates could be achieved. It would be a further desirable achievement if such new class of isocyanurate chemical catalysts could be equally adopted in preparing isocyanurate foams useful as both rigid and flexible foams in making panels, slabs and sprayed foam.

It therefore is an object of the present invention to provide new isocyanurate catalysts. It is further an object of this invention to provide isocyanurate catalysts which can be utilized in preparing rigid, flexible, semi-rigid or semi-flexible isocyanurate foams. Another object of the present invention is to provide isocyanurate foams utilizing a new class of isocyanurate group formation catalysts. Finally, it is an object of the present invention to prepare modified polyisocyanurate foams which have suitable thermal stability, uniform cell structure, low friability, excellent adhesion and other sought-after properties, using a new class of isocyanurate catalysts.

SUMMARY OF THE INVENTION

It has now been found that the potassium salts of carboxyl-terminated butadiene-acrylonitrile copolymers are extremely useful as catalysts in preparing modified cellular polyisocyanurate foams. Said foams are prepared by reacting together in the presence of a blowing agent a polyether or polyester polyol and an aromatic polyisocyanate utilizing as an isocyanurate group formation catalysts said butadiene-acrylonitrile copolymer containing carboxy-terminated groups in potassium salt form. The resultant cellular polymer thus contains recurring isocyanurate and urethane linkages or groups.

DETAILED DESCRIPTION OF THE INVENTION

The isocyanurate foams of the present invention are prepared by mixing a polyisocyanate, a polyether of polyester polyol, an inert blowing agent and the potassium salt of a carboxyl-terminated butadiene-acrylonitrile copolymer as an isocyanurate group formation catalyst under conventional foaming conditions utilizing known mixing devices employed in the manufacture of polymeric foams. The mixing of the materials for the formulation of the reaction product is not critical to the invention. Examples of conventional polymer foam formation processes and equipment are described in Ferrigeno, "Rigid Plastic Foams," Reinhold Publishing Corporation, New York, N.Y. 1963.

The potassium salts of the carboxyl-terminated copolymers of butadiene-acrylonitrile may be prepared by reacting potassium hydroxide with the present acid copolymer represented by the following structural formula:

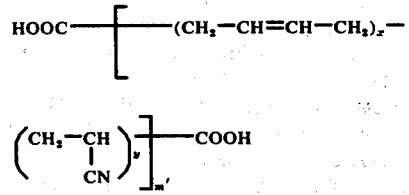

wherein $x$ may range from 1 to 10, $y$ is 1, and $m$ may range from about 7 to 13.

More specifically, the catalysts here may be prepared from a carboxyl-terminated butadiene-acrylonitrile copolymer made by reacting 1–10 moles of butadiene per mole of acrylonitriles, followed by further modification such as oxidation and the like to produce pendant carboxyl groups. More preferred copolymers are made by reacting 3–7 moles of butadiene per mole of acrylontrile.

The carboxyl-terminated copolymers of butadiene and acrylonitrile from which the potassium salts are made are normally liquid in character and have an average molecular weight range of from about 2500 to about 4500. More often the weight range is 3000–3500.

Again, said copolymers preferably have a carboxyl functionality of 1.6–2.6, and most preferably have a carboxyl functionality of 1.8–2.4.

Representative copolymers useful as isocyanurate group formation catalysts are available from B. F. Goodrich Chemical Company under the tradename Hycar®. Various grades of the copolymer present depending upon the percent acrylonitrile in the polymer and/or whether the copolymer has in addition to terminal carboxyl functionality a random carboxyl functionality also. Particularly, useful catalysts here are available under the tradenames Hycar CTBN and CTBNX.

The carboxyl-terminated liquid polybutadiene-acrylonitrile polymers such as the Hycar type are said to be useful as resin modifiers such as epoxy and polyester resin toughening agents, and particularly to modify epoxy structural adhesives and epoxy and polyester structural fiberglass composites. They have also been suggested for use as resin modifiers in epoxy resin coatings, vinyl plastisol sealings, epoxy resin encapsulants for electrical/electronics, and as modifiers of rigid "one-shot" urethane foams. Heretofore, there has been no suggestion that said compounds may be useful for the preparation of catalysts in the polyurethane foam art, and particularly as catalysts in making polyisocyanurate foams.

Particularly useful liquid catalysts sold under the tradename Hycar tradename have the following properties noted in Table I below.

TABLE I

|  | Hycar CTBN (1300×8) | Hycar CTBN (1300×13) | Hycar CTBNX (1300×9) |
|---|---|---|---|
| Brookfield Viscosity 27° C.-cps | 125,000 | 625,000 | 135,000 |
| Percent acrylonitrile | 18 | 28 | 18 |
| Color | Amber | Amber | Amber |
| Molecular Weight (M̄n) | 3,200 | 3,000 | 3,400 |
| Carboxyl Functionality | 1.85 | 1.80 | 2.40 |
| EPHR Carboxyl* | 0.055 | 0.055 | 0.072 |
| Specific Gravity | 0.948 | — | 0.955 |

*Equivalents per hundred rubber

Any aromatic polyisocyanate may be used in the practice of the instance invention. Typical aromatic polyisocyanates include m-phenylene diisocyanate, p-phenylene diisocyanate, polymethylene polyphenylisocyanate, 2,4-tolylene diisocyanate, 2,6-tolylene diisocyanate, dianisidine diisocyanate, bitolylene diisocyanate, naphthalene-1,4-diisocyanate, diphenylene-4,4'-diisocyanate; aliphatic-aromatic diisocyanates, such as xylylene-1,4-diisocyanate, xylylene-1,3-diisocyanate, bis(4-isocyanatophenyl) methane, bis(3-methyl-4-isocyanatophenyl) methane, and 4,4'-diphenylpropane diisocyanate.

Greatly preferred aromatic polyisocyanates used in the practice of the invention are methylene-bridged polyphenyl polyisocyanate mixtures. These latter isocyanate compounds are generally produced by the phosgenation of corresponding methylenebridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents, for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 weight percent methylene diphenyldisocyanate isomers with the remainder being polymethylene polyphenyl polyisocyanates having higher functionalities and higher molecular weights. Typical of these are polyphenyl polyisocyanate mixtures containing about 20 to 100 weight percent methylene diphenyldiisocyanate isomers, of which 20 to 95 weight percent thereof is the 4,4' isomer, with the remainder being polymethylene polyphenyl polyisocyanates of higher molecular weight and functionality that have an average functionality of from about 2.1 to about 3.5. The isocyanate mixtures are known, commercially available materials and can be prepared by the process described in U.S. Pat. No. 3,362,979, issued Jan. 9, 1968 to Floyd E. Bentley.

Any conventional polyether or polyester polyol may be used in making the isocyanurate foams here. Illustrative of these one can mention the following types:

a. Polyoxalkylene polyols including the adducts of alkylene oxides with, for example, water, ethylene glycol, diethyl glycol, propylene glycol, dipropylene glycol, glycerol, 1,2,6-hexanetriol, 1,1,1-trimethylolethane, 1,1,1-trimethylolpropane, pentaerythritol, sorbitol, sucrose, lactose, alphamethylglucoside, triisopropanolmaine, ethylenediamine, diethylenetriamine, novolak resins, phosphoric acid, benzenephosphoric acid, polyphosphoric acids such as tripolyphosphoric acid and tetrapolyphosphoric acid, phenyol-aniline-formaldehyde ternary condensation products, aniline-formaldehyde condensation products, and the like. The alkylene oxides employed in producing the polyoxyalkylene polyols normally have from 2 to 4 carbon atoms. Propylene oxide and mixtures of propylene oxide with ethylene oxide are preferred. It is known that the random or block structures can be obtained depending upon the particular known procedures use for their preparation.

b. Polyesters of polyhydric alcohols and polycarboxylic acid such as those prepared by th reaction of an excess of ethylene glycol, propylene glycol, 1,1,1-trimethylolpropane, glycerol, or the like, with phthalic acid, adipic acid, and the like.

c. Lactone polyols prepared by reacting a lactone such as epsilon-caprolactone or a mixture of epsilon-caprolactone and an alkylene oxide with a polyfunctional initiator such as a polyhydric alcohol, an amine, or an amino-alcohol.

d. Phosphorus-containing derivatives such as tris(dipropylene)glycol phosphite and other phosphites.

e. The polymer/polyols produced by the in situ polymerization of a vinyl monomer in a polyol, as disclosed in U.S. Pat. Nos. 3,304,273, 3,383,351 and 3,523,093.

The foregoing are merely illustrative and represent only a small number of the many polyols known in the art that can be employed with the copolymeric catalyst salts in the process of this invention.

The polyol or polyol mixture employed can have a hydroxyl number which can vary over a wide range. In general, the hydroxyl number of the polyols employed can range from about 20, and lower, to about 1000, and higher, preferably from about 20 to 800, and more preferably, from 35 to about 700. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = (56.1 \times 1000 \times f/M.W.)$$

where
$f$ = average functionality, that is, the average number of
$OH$ = hydroxyl number of the polyol hydroxyl groups per molecule of polyol
$M.W.$ = average molecular weight of the polyol The exact polyol employed depends upon the end-use of the polyisocyanurate foam. The molecular weight and the hydroxyl number are selected properly to result in flexible, semi-flexible, semi-rigid or rigid products. The polyol preferably possesses a hydroxyl number of from about 200 to about 1000 when employed in rigid formulations, from about 50 to about 250 for semi-flexible foams, and from about 20 to 70 or more when employed in flexible foam formulations. Such limits are not intended to be restrictive. but are merely illustrative of the large number of possible combinations of the polyols that can be employed.

Greatly preferred polyether or polyester polyols have a hydroxyl number within a range of from about 100 to about 500, and a molecular weight from about 100 to about 1000.

Foaming is accomplished by employing in a minor amount (for example, from about 0.5 to 25 weight percent, based on total weight of the reaction mixture), of blowing agents which are vaporized by the exotherm of the isocyanato-reactive hydrogen reaction. The preferred blowing agents are certain halogen-substituted aliphatic hydrocarbons which have boiling points between about 40° C and 70° C, and which vaporize at or below the temperature of the foaming mass. The blowing agents include, for example, trichloromonofluoromethane, dichlorodifluoromethane, dichloromonofluormethane, dichloromethane, trichloromethane, bromotrifluoromethane, chlorodifluoromethane, chloromethane, 1,1-dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro-1, 2,2-trifluoroethane, 1,1,1-trichloro-2,2,2-trifluoroethane, 2-chloro-1,1,1,2, 3,3,4,4,4-nonafluorobutane, hexafluorocyclobutene, and octafluorocyclobutane. Other useful blowing agents include water and low-boiling hydrocarbons such as butane, pentane, hexane, cyclohexane, and the like. Many other compounds easily volatilized by the exotherm of the isocyanato-reactive hydrogen reaction also can be employed. A further class of blowing agents includes the thermally unstable compounds which liberate gases upon heating, such as N,N'-dimethyl-N,N'-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pound per cubic foot respectively.

In addition to the copolymer salt catalysts an additional isocyanurate group formation catalyst to promote trimerization may also be employed or catalysts to promote polyurethane formation. Such catalysts include strong bases, alkali metal salts of carboxylic acids, non-basic metal salts of carboxylic acids and aliphatic tertiary amines. For example, suitable strong bases include quarternary ammonium hydroxide, alkali metal hydroxide and alkali metal alkoxides. Suitable alkali metal salts of carboxylic acids include, for example, sodium acetate, potassium octoate, potassium acetate, sodium benzoate, and the like. Examples of suitable tertiary amines are N,N'-diethylpiperazine, N,N'-dimethylpiperazine, trialkylamines such as trimethylamine, triethylenediamine, tributylamine, 2,4,6-tris(-dimethylaminomethyl)phenol, and N,N',N''-tri(dimethylaminopropyl)hexhydra-s-triazine and the like.

The particular amount of the copolymeric salt catalyst employed can vary over a wide range and is not critical so long as it is present in amounts sufficient to promote trimerization of the isocyanate mixture. Preferably the catalyst is added in an amount of 1–10 percent by weight of catalyst based on the weight of the cellular foam system. More often, the catalyst is most preferably added in an amount of from 2 percent up to about 8 percent by weight, based on the total foam formulation weight.

If desirable, the isocyanurate foams of the invention can be formulated to include flame retardant components to improve the fire retardancy of the foams. Any known fire retardant component compatible with isocyanurate foams can be employed. This would include both the reactive and additive type fire retardants. Representatives of the additive types include halogenated organic phosphates such as tris(chloroethyl)phosphate, tris(2,3-dibromopropyl) phosphate, triphenyl phosphite, diammonium phosphate, and antimony oxide. Representatives of the chemically bound types are diethyl-N,N'-bis(2-hydroxyethyl)aminomethyl phosphonate, chlorendic acid derivatives, and phosphorous-containing polyols. When employed, the fire retardant component is added to the above-described isocyanate mixture with some other component or as a preformed mixture with some other component described hereinbefore, in an amount of about 1 to about 20 weight percent of the total foam formulation.

Furthermore, fillers can be employed in the preparation of the isocyanurate foams, if desired in amounts within the range of about 0.1 to about 20 weight percent of the total foam formulation. Any conventional filler known in the art to be compatible with isocyanurate foam manufacture can be employed, such as hydrated alumina, polyethylene, aluminum powder, and various clays and talcs.

An emulsifier or stabilizing agent may also be used in the preparation of the isocyanurate foams of this invention including, for example, sulfonated castor oil or the like. One preferred foam stabilizer is that based on silicone such as, for example, a polydimethyl siloxane or a polyoxyalkylene block copolymer of a silane. The latter type of silicone oil is disclosed in U.S. Pat. No. 2,834,748. Other surfactants or emulsifying or dispersing agents which may be used include ethylene oxide modified sorbitan or monopalmitate or ethylene oxide modified polypropylene ether glycol.

The amount of polyol employed in relation to the organic aromatic polyisocyanate is not critical, but preferably ranges in an amount of from about 0.1 to about 0.8 equivalents per equivalent of polyisocyanate. Optimally, about 0.2 to about 0.6 equivalents per equivalent of polyisocyanate is employed. Moreover, the polyol can be added to the polyisocyanate as a separate component or as a preformed mixture with one or more of the other components.

To prepare the isocyanurate foams of the invention, the above discussed ingredients may be simultaneously, or independently intimately mixed with each other by the so-called "one-shot" method to provide a foam by a one-step process. Proportions of ingredients are properly adjusted to give flexible, rigid, semi-flexible or semi-rigid foams. In preparing flexible foams usually water is also employed as part of the blowing agent. In addition to the "one-shot" method the "quasi-prepolymer method" may also be employed. Here, a portion of the polyol is reacted in the absence of a catalyst with the polyisocyanate component. Thereafter to prepare a suitable foam, the remaining portion of the polyol is added and reaction allowed to go to completion in the presence of catalyst along with other appropriate additives such as blowing agents, foam stabilizing agents, fire retardants, etc.

Again, the isocyanurate foams of the present invention may be prepared over a wide range of temperatures. However, normally, the reaction is initiated at room temperature, and the only heat involved is that generated by the polymerization itself.

The invention will be illustrated further with respect to the following specific examples, which are given by way of illustration and are not to be construed as a limitation upon the scope of this invention.

EXAMPLE I

A 500 ml 3-neck flask equipped with a mechanical stirrer was charged with 100 grams of Hycar CTBN, 100 ml methanol, and 100 ml benzene. To this was added 2.93 grams of 85 percent solid potassium hydroxide. The solution was stirred until all the potassium hydroxide had dissolved. One hundred grams of a polyol comprising the propylene oxide adduct of glycerine having a molecular weight of about 700 in 50 ml of benzene were then added to the above followed by complete stripping of solvent at reduced pressure. The resultant potassium salt of the carboxyl-terminated butadiene-acrylonitrile copolymer then remained as a 50 percent solution in the polyol.

EXAMPLE II

Here a foam was prepared utilizing the catalyst of Example I. Specifically, an aromatic polyisocyanate in an amount of 100 grams was mixed with 49.4 grams of a polyol having a OH No. of 187 and functionality of 2.5, 1.0 grams of silicone polyether, 24 grams of trichloromonofluoromethane blowing agent and 16 grams of the 50 percent solution of the catalyst of Example I. The reactants were then mixed, using a drill press for 5 seconds and then poured to give a foam with a 30 second cream and a 180 second rise time. The specific polyisocyanate utilized was a methylene-bridged polyphenyl polyisocyanate mixture containing about 46 percent by weight methylene diphenyldiisocyanate isomers of which about 20 percent is the 2,4'-isomer, with the remainder being higher functionality and higher molecular weight polymethylene polyisocyanates which have an average functionality of about 2.7.

EXAMPLE III

A 1 liter 3-necked flask equipped with a mechanical stirrer was charged with 150 grams of Hycar CTBNX, 200 ml of benzene and 100 ml of methanol. To this was added 7 grams of potassium hydroxide (85 percent) dissolved in methanol. The reactants were stirred for 30 minutes and then 50 grams of the polyol of Example I was added. Solvent was then removed using an aspirator vacuum at 100° C temperature.

EXAMPLE IV

Yet another foam was prepared as follows. The foam components of Example II were used as a foam formulation in amounts stated there along as a sole catalyst source 16 grams of the catalyst of Example III (75 percent catalyst in polyol). The reactants were then mixed using a drill press for 4 seconds, and then poured to give a 6 second cream and a 70 second rise time.

EXAMPLE V

An additional foam was prepared according to the manner set out in Examples II and IV and its properties further explored. Specifically, 50.7 grams of aromatic polyisocyanate was mixed with 22.8 grams of a polyol having a OH No of 187 and functionality of 2.5, 0.5 grams of silicone polyether, 18 grams of trichloromonofluoromethane blowing agent and 8 grams of the catalyst of Example III.

The resultant foam had a density of 2.25pcf, a K-factor of 0.171, a 32.94 psi compression strength with rise, a 11.18 psi compression strength crossrise and a heat distortion of 192° C. The foam had 88.86 percent closed cells, and a dimensional stability after 1 week at 158° F, 100 percent room humidity of 4.6 percent increase in volume, 8.7 percent decrease in weight and 3.4 percent increase in linearity. Its dimensional stability at 180° F under dry conditions were 0.6 percent change in volume, 7.7 percent change in weight and no change in linearity. At 20° F under dry conditions, the change in volume was 1.1 percent, change in weight 1.8 percent and the change in linearity 0.7 percent.

In the Butler Company Test (Kreuger O. A. and Jackson, D. E., J. Cellular Plastics, 3,497–501, 01,1967) the percent weight retained was 96.6 percent, the seconds to extinguish were 10.8 and the flame height was 6.83 inches.

Lastly, the friability under the ASTM C-421 (1961) Test C was 6.7 percent weight loss.

Additionally confirming foam runs were made utilizing catalysts described above. Fast curing foams were made which nevertheless could be properly processed. In each instance the foams had good dimensional stability, resistance, and low friability. In addition, and most importantly, the catalyst had a suitable cure time such that proper end-cure was achieved within the sought-after time. Both cream time and rise times were acceptable.

It is to be understood that the above examples are given for the purpose of illustration and that a wide variety of polyisocyanates, inert blowing agents, foam stabilizers, polyols, etc. can be used with equal facility employing the catalyst herein described, providing that the teachings of the disclosure are followed.

Although the invention has been described in considerable detail in the foregoing disclosure, it is to be understood and that many variations can be made by those skilled in the art without departing from the spirit and scope of the invention except as set forth in the claims.

We claim:

1. In a process for preparing a cellular polymer containing recurring isocyanurate and urethane linkages which polymer comprises the reaction product obtained by the bringing together in the presence of a blowing agent a polyether or polyester polyol, an aromatic polyisocyanate, and an isocyanurate group formation catalyst; the improvement which comprises utilizing in at least a catalytically effective amount as said isocyanurate catalyst the potassium salt of a carboxyl-terminated butadiene-acrylonitrile copolymer, said copolymer represented by the following structural formula:

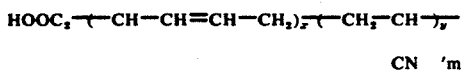

where $x$ may range from 1 to 10, $y$ is 1, and $m$ may range from about 7 to 13, said copolymer having an average molecular weight range of 2500–4500.

2. The process of claim 1 wherein said copolymer is prepared by reacting 1–10 moles of butadiene per mole of acrylonitrile.

3. The process of claim 1 wherein said molecular weight range is 3000–3500.

4. The process of claim 2 wherein said copolymer is prepared by reacting 3–7 moles of butadiene per mole of acrylonitrile.

5. The process of claim 1 wherein said copolymer has a carboxyl functionality of 1.6–2.6.

6. The process of claim 5 wherein said carboxyl functionality is 1.8–2.4.

7. The process of claim 2 wherein said polyisocyanate is a methylenebridged polyphenyl polyisocyanate mixture.

8. The process of claim 1 wherein said catalyst is utilized in an amount ranging from about 1 to about 10 percent based on the weight of said cellular polymer.

9. The process of claim 8 wherein said catalyst is utilized in an amount of 28 percent by weight.

* * * * *